United States Patent
Abbo et al.

(10) Patent No.: US 8,870,329 B2
(45) Date of Patent: Oct. 28, 2014

(54) ISSUE DETECTION IN A DIGITAL PRINTER

(75) Inventors: Haggai Abbo, Kyriat Ono (IL); Martin Chauvin, Berlin (DE); Omry Flum, Tel Aviv (IL); Yuri Baril, Tel Aviv (IL); Sharon Nagler, Gan Yavna (IL); Craig Breen, Rehovot (IL); Shai Druckman, Givatayim (IL); Ami Shiff, Tel Aviv (IL); Avner Arnstein, Rehovot (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 255 days.

(21) Appl. No.: 13/362,728

(22) Filed: Jan. 31, 2012

(65) Prior Publication Data
US 2013/0194340 A1    Aug. 1, 2013

(51) Int. Cl.
*B41J 29/38* (2006.01)
*B41J 11/42* (2006.01)

(52) U.S. Cl.
CPC . *B41J 11/42* (2013.01); *B41J 29/38* (2013.01)
USPC .......................................................... 347/16

(58) Field of Classification Search
CPC .......... B41J 11/42; B41J 29/393; B41J 29/38; B41J 3/60; B41J 11/0095
USPC ........... 347/16, 224, 225, 228, 232, 233, 245, 347/248
See application file for complete search history.

(56) References Cited

U.S. PATENT DOCUMENTS

| | | | |
|---|---|---|---|
| 6,449,567 B1* | 9/2002 | Desai et al. | 702/58 |
| 7,174,264 B2 | 2/2007 | Yasukawa et al. | |
| 7,940,425 B2 | 5/2011 | Ohta et al. | |
| 2005/0262394 A1 | 11/2005 | Yasukawa et al. | |
| 2006/0088345 A1* | 4/2006 | Koizumi | 399/301 |
| 2007/0236557 A1* | 10/2007 | Imai et al. | 347/259 |
| 2008/0137914 A1* | 6/2008 | Minhas | 382/112 |

FOREIGN PATENT DOCUMENTS

| | | |
|---|---|---|
| JP | 2008160223 A | 7/2008 |
| WO | 2010063800 A1 | 6/2010 |

\* cited by examiner

*Primary Examiner* — Manish S Shah
*Assistant Examiner* — Yaovi Ameh

(57) ABSTRACT

Detecting an issue in a digital printer that has an optical element positioned to direct a laser beam towards a photoconductor surface may include sending optical element position commands to move the optical element to compensate for inconsistent movements of a photoconductor drum and creating a record of the optical element position commands.

16 Claims, 4 Drawing Sheets

ISSUE DETECTION IN A DIGITAL PRINTER

BACKGROUND

Some digital printers write an electrostatic latent image on a photoconductor drum with a laser beam. In areas where the beam contacts the photoconductor drum, the electric charge on the surface of the photoconductor drum is cancelled. In the next stage of printing, ink or toner is provided to the surface of the drum to develop the latent image. The ink is then mechanically rolled off the photoconductor drum's surface onto either a printing medium or an intermediary surface.

Generally, the laser beam is directed to the photoconductor drum's surface with a mirror or prism that adjusts for inconsistent rotary speeds of the photoconductor. The positioning of the mirror is timed to the photoconductor drum's rotary speed to form an accurate latent image and thereby an accurate printed image on the printing medium.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

As indicated above, in laser printers, a laser beam is directed to a photoconductor drum surface with a moving optical element, such as a mirror or prism. The optical element can be controlled to adjust for inconsistent rotary speeds of the photoconductor drum. However, at some point, it may become desirable to correct, rather than merely adjust for, the issues causing inconsistent rotary speeds of the photoconductor drum.

The present specification describes principles including, for example, a method for detecting an issue in a digital printer that has an optical element positioned to direct a laser beam towards a photoconductor surface. An example of such a method includes sending optical element position commands to move the optical element to compensate for inconsistent movement of a photoconductor drum and creating a record of the optical element position commands. This record can then be used to diagnose what issue or issues are causing inconsistent rotary speeds in the photoconductor drum.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described is included in at least that one example, but not necessarily in other examples.

Figure 1:
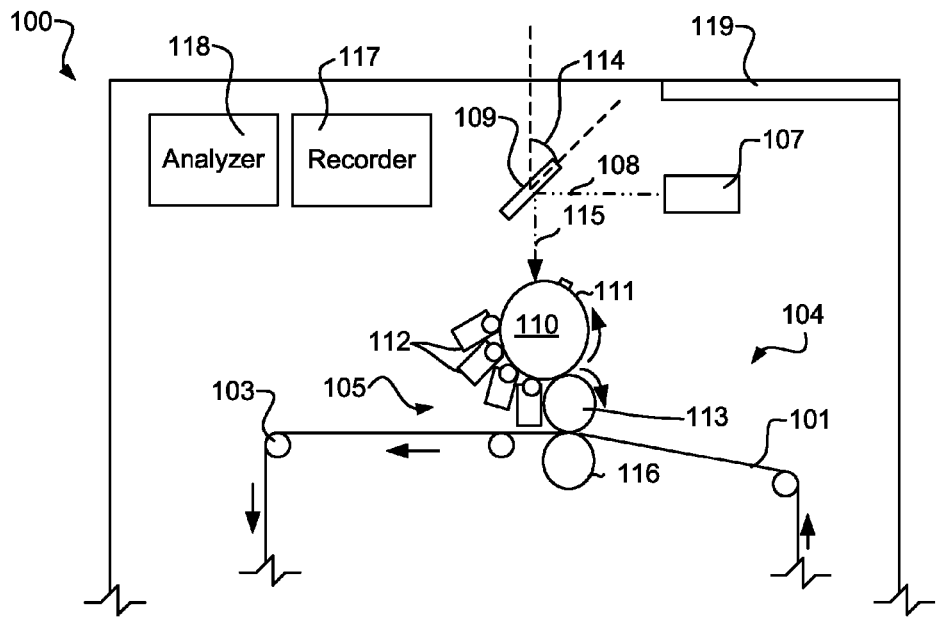
FIG. 1 is a cross sectional diagram of an illustrative digital printer, according to principles described herein.

FIG. 1 is a cross sectional diagram of an illustrative digital printer (100). A printing medium (101), such as paper, is conveyed along a printing pathway within the printer (100). A plurality of wheels (103) is positioned to guide the printing medium along the printing pathway (104). The printing medium (101) is moved towards a marking engine (105) where an image is imposed on the medium (101). The medium (101) is next conveyed to another station within the printer. In some examples, the printing medium is fed through the marking engine as a continuous sheet, like in web machines. In other examples, the printing medium is fed through the marking engine as individual sheets.

The marking engine (105) may include several components that collectively produce an image on the printing medium (101). For example, as described above, a laser source (107) may emit a laser beam (108) towards an optical element (109) that directs the beam (108) towards a photoconductor drum (110). The optical element may be, for example, a mirror or other reflective surface. In other examples, the optical element may be a prism or another element that refracts the laser beam towards the photoconductor drum.

As the laser beam (108) contacts the drum's surface (111), the electric charge on the surface exposed to the beam's energy is cancelled or dispersed. Thus, the surface of the drum contains areas with different charges thereby creating an electrostatic latent image. At the next stage of the printing process, ink, from an ink source (112), is used to develop the latent image. Depending on the characteristics of the system, the ink may be attracted to the charged or the discharged areas of the latent image and the laser beam (108) will be used to write a negative or positive image accordingly. The ink may be liquid ink or a powder ink, such as toner. In some examples, the ink is oil based and forms a thin layer on the drum surface.

Next, the ink may be rolled onto a transfer belt or an intermediary drum (113), such as a blanket cylinder, that transfers the ink to the printing medium (101). In the illustrated example, a pressure drum (116) is positioned to provide pressure to the printing medium (101) sufficient to transfer the ink from the intermediary drum (113) onto the printing medium (101). In some examples, the ink is rolled onto the printing medium (101) directly from the photoconductor drum (110).

The laser source (107) may be in communication with an image writing controller that accesses a data source containing information about the image to be printed. Often, the data source is contained in a computer or a remote location in communication with the printer. In most examples, the data for the image is downloaded or stored in the printer itself. In some examples, the printer comprises the ability to scan an image and create the data files used for printing based on the scanned image. The image writing controller may send commands to the laser beam source (107) instructing the source to scan the laser beam over the photoconductor drum surface and emit the laser beam at specified times to write the latent image. The rotation of the photoconductor drum (110) and the printing medium's rate of travel along the printing pathway (104) may be timed with the commands of the laser beam source.

In some examples, the laser source controls multiple laserbeams at the same time. In alternative examples, a single beam is produced by the laser source.

The laser source may (107) direct a beam (108) towards an optical element (109), such that the beam (108) contacts the optical element (109) at an angle (114) that reflects the beam (108) onto the photoconductor drum (110). As the laser source (107) sweeps through various emission angles, the laser beam (108) may contact the optical element (109) at multiple locations.

Laser beam emission and the photoconductor drum's rotation may be timed with respect to each other. To accommodate for inconsistencies in the drum's rotation, an optical element controller commands a position adjuster (210, FIG. 2) to change the optical element's angle (114) as needed to move a reflected portion (115) of the laser beam in the direction or against the direction of the photoconductor drum's rotation. Thus, the optical element position commands may correspond to the photoconductor drum's non-constant rotation speed, and a replica of the photoconductor drum's non-uniform speed may be derived from the optical element position commands.

Inconsistencies in the drum's rotation may occur for various reasons. In general, most functions along the printing pathway may increase or decrease a load on a main motor that drives the photoconductor drum. For example, a main motor may rotate the photoconductor drum, an intermediary drum, and the pressure drum collectively through friction between the drums and/or gears connecting the drums. Components of the motor may overheat or fail, which may change the load on the motor. In other examples, gears or bearings associated with the motor may wear or break. In some examples, tension on the printing medium may also increase or decrease the load on the motor, thus, grippers, tension wheels, printing mechanism conveyance mechanisms, and combinations thereof may also affect the rotary speed of the photoconductor drum.

Further, components from the following non-exhaustive list associated with the photoconductor drum (110), the intermediary drum (113), the pressure drum (116), or combinations thereof may affect the photoconductor drum's rotation. The non-exhaustive list may include brakes, controllers, couplings, gears, transmissions, flywheels, pulleys, chains, axels, balancing weights, sensors, gripping surfaces, bearings, and combinations thereof. Issues with any of these components may be mechanical issues, material issues, or electrical issues. Further, misalignment, plastic deformation, overheating, cracking, creep, corrosion, buckling, delamination, fatigue, wear, hardening, thermal expansion, or combinations thereof of any of the drums, motor, or their associated parts may affect the load on the motor, and therefore, the photoconductor's rotary speed.

The issues may manifest themselves by causing the photoconductor to rotate inconsistently. Many of these issues may result in unique patterns of inconsistent rotation. A recorder (117) may be programmed to make a record of the optical element position commands to accommodate for the inconsistent speeds. The record may be analyzed by an analyzer (118) programmed to identify any inconsistent rotation patterns. Such patterns may be displayed on a display of a user interface (119) of the printer (100) or a device in communication with the analyzer (118).

The user interface may comprise a touch screen or key pad to request a diagnosis of a printer issue. In some examples, the user interface may allow a user or a repair person to view the record or its analysis. In some examples, the user interface may comprise options that allow the user to view the information in the record in multiple formats that may be useful to a user or repair person.

In some examples, the analyzer is a separate device that may download the record from the printer (100). The printer (100) may also send the record to a remote location for analysis. In some examples, the analysis may be sent to a remote location, such as over a network or internet.

Figure 2:
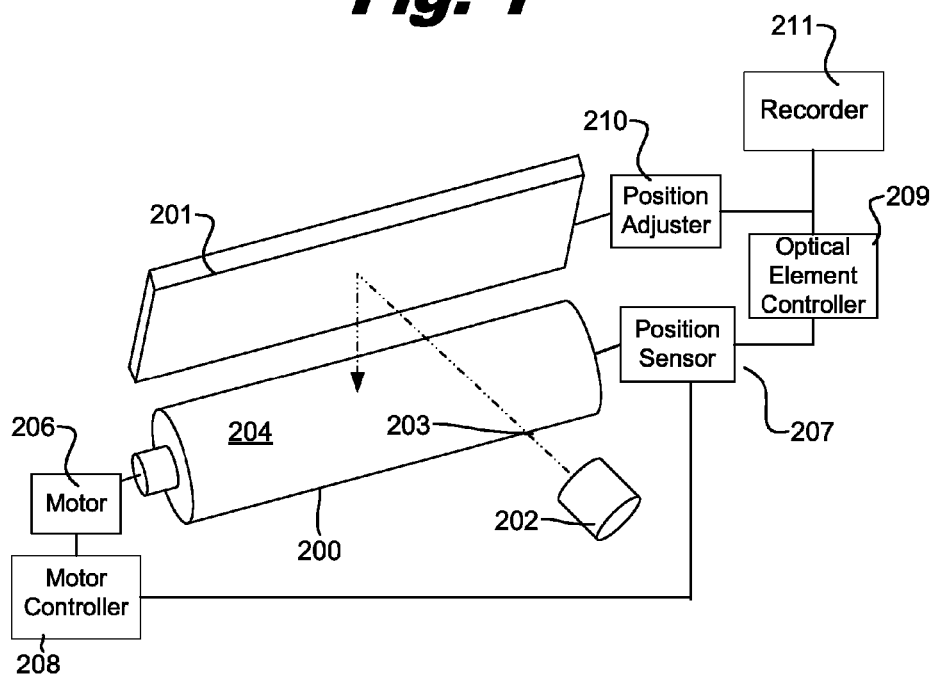
FIG. 2 is a diagram of an illustrative photoconductor drum and an optical element, according to principles described herein.

FIG. 2 is a diagram of an illustrative photoconductor drum (200) and an optical element (201). A laser source (202) may emit a laser beam (203) towards the optical element (201) to direct the beam (203) onto the surface (204) of the photoconductor drum (200).

A motor controller may send commands to a motor (206) that rotates the photoconductor drum (200). A drum position sensor (207) may read the actual rotary speed of the drum (200) and supply a motor controller (208) with the drum's actual speed. The drum's angular position may be measured by encoders or other sensors capable of measuring angular position. Also, in some examples, a photoconductor surface may be a linearly translated surface such a plate, and its movement may be measured with a linear variable differential transformer or other sensor capable of determining the linear movement. The motor controller (208) may compare the commanded rotation with the actual rotation supplied by the drum position sensor (207). If discrepancies between the commanded and actual rotations exist, the motor controller (208) may cause the motor to make adjustments.

In some examples, the motor controller (208) may cause the motor (206) to compensate for slow rotary inconsistencies. In some examples, slow disturbances may not reveal significant issues with the printer. Faster speed disturbances, on the other hand, may be more useful for indentifying issues with the printer. The motor controller may not be quick enough to compensate for fast disturbances due to the collective inertia of the drums. Thus, in some examples, speed disturbances are compensated almost exclusively by the optical element controller (209).

In some examples, the motor turns an axel of the photoconductor drum. In other examples, the motor turns gears mechanically connected to the photoconductor drum. In other examples, the motor rotates the pressure drum or intermediary drum so that the photoconductor drum rotates due to its friction with these drums. In some examples, the motor turns a rod that rotates an outer surface of one of these drums through friction.

In the example of FIG. 2, the drum position sensor (207) may also output the actual rotation to an optical element controller (209) that instructs a position adjustor (210) to change the position of the optical element (201) based on input from the drum position sensor (207). In some examples, the drum position sensor (207) may instruct the position adjuster (210) to compensate for the photoconductor drum's speed variations. In some examples, the optical element controller (209) may receive rotary information about the photoconductor drum from the drum position sensor or through a combination of the sources, such as the motor controller (208), an output of the motor (206), or combinations thereof. In some examples, the optical element controller (209) receives its input from sources other than the drum position sensor (207).

The recorder (211) may record the optical element position commands. The recorder may create a record of the optical element position commands at a sampling rate fast enough to capture useful data. For example, the record may contain a sampling rate of at least 75 hertz. In other examples, the sampling rate may be greater than 100 hertz. In other examples, the sampling rate may be about 500 hertz. In some examples, the sampling rate frequency is faster than a frequency of the photoconductor drum's rotary speed. In some examples, the sampling rate may be faster than the frequency of the disturbance.

Figure 3:
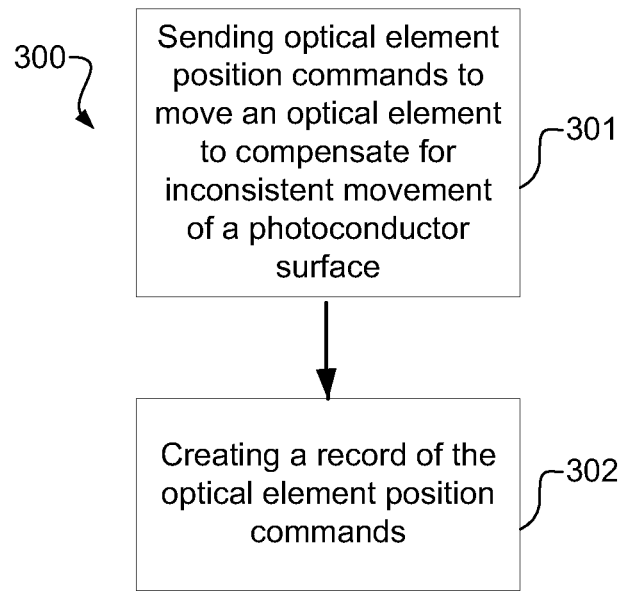
FIG. 3 is a flowchart of an illustrative method for detecting an issue in a digital printer, according to principles described herein.

FIG. 3 is a diagram of a method (300) for detecting an issue in a digital printer. The method includes sending (301) optical element position commands to move an orientation of an optical element to compensate for inconsistent rotary speeds of a photoconductor drum and creating (302) a record of the optical element position commands. The method may additionally include analyzing the record to detect an issue and displaying at least one parameter of the record. In some examples, the method may further include sending the record to a remote location. Sending the record may occur before analysis, and the record is analyzed at the remote location. In some examples, the record is sent after the analysis is completed. In such examples, the records may be compared to other records of the same type of printer so that potential modifications for the printer may be considered. Also, the records may be further analyzed to improve detection process methods and functions.

Figure 4:
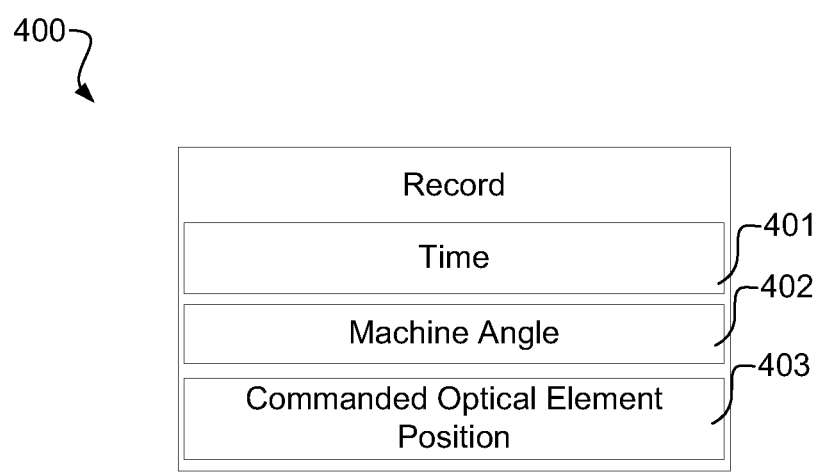
FIG. 4 is a diagram of an illustrative record, according to principles described herein.

FIG. 4 is a diagram of an illustrative record (400). The record may contain parameters that include time (401), machine angle (402), and commanded optical element position (403). In some examples, the record may contain other parameters, such as position command of the motor, actual position of the motor, speed command of the motor, actual speed of the motor, electrical current command to the motor, actual electrical current to the motor, or combinations thereof. In some examples, the record contains raw data, filtered data, or combinations thereof.

The analyzer may analyze the record to determine if an issue is likely to exist. The analyzer may be located in the printer, a peripheral device, or at a remote location. In some examples, the recorder creates a record that stores information in a format that allows a user or repair person to easily identify patterns of the optical element's movement in such a way that the issue is determined without programmed analyses of the record.

In some examples, the recorder makes a record of the optical element position commands in real time during printing jobs. The recorder may create the record when commanded, during every printing job, periodic printing jobs, or printing jobs that conform to specific criteria. Such criteria may include color printing jobs, monochromatic printing jobs, simplex jobs, duplex jobs, printing jobs calling for amount of printing medium above a minimal amount, printing jobs utilizing a specific type of printing media, printing jobs calling for a particular size of printing medium, or combinations thereof.

In some examples, the recorder creates a record during an issue detection test. In some examples, these tests may be performed by a repair person or one of the printer's users through the use of a testing program.

Figure 5:
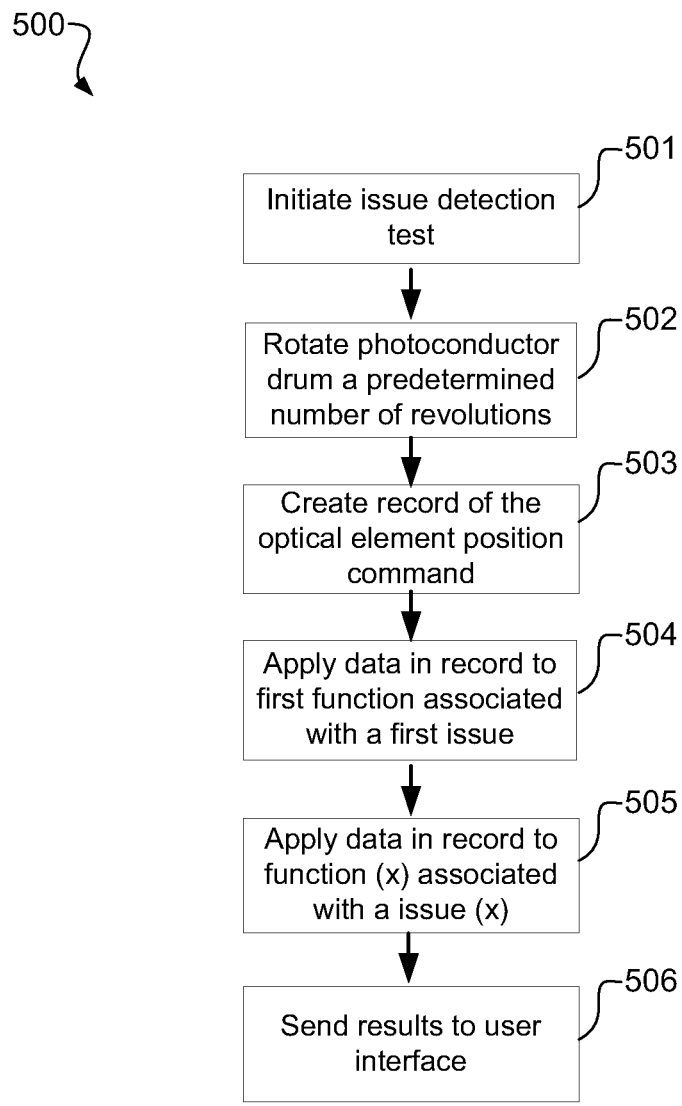
FIG. 5 is a flowchart of an illustrative method for detecting an issue in a digital printer, according to principles described herein.

FIG. 5 is a flowchart of an illustrative method (500) that may be performed in an issue detection test. The method may include initiating (501) the issue detection test. The program may rotate (502) the photoconductor drum for a predetermined number of revolutions. The predetermined revolutions may include enough revolutions to determine at least most issues of the printer. In some examples, the predetermined revolutions number may be set at 50 or more revolutions. In some examples, the program may sense that additional revolutions may be helpful and cause drum to rotate for an additional number of revolutions.

The laser beam may be activated during the test, and an image be transferred to a printing medium. In some examples, the laser beam is applied to the optical element, but ink is not applied to a printing medium. Further, the laser beam may be inactivated during the test, but the optical element may still function as though the laser beam was activated. Regardless, of which option the test utilizes, the optical element controller receives position commands as though an image is to be printed on a printing medium.

The recorder may create (503) the record during the photoconductor drum's revolutions. An analysis of the record may be performed in real-time or after the record is completed. The record's data may be applied (504) to a first function to determine if a first issue associated with the first function exists. The data from the record may also be applied (505) to a second function or subsequent function represented as function (x) associated with an issue (x). The test program may send (506) to the user interface the results of the test. If any of the performed functions result in an output within a range that suggests an issue, such an issue may be identified in the test results.

The record's data may be applied to as many functions associated with issues as available to the program. In some examples, the analysis may terminate upon finding a single suspected issue. In other examples, the analysis may continue to find as many potential issues as available.

Figure 6:
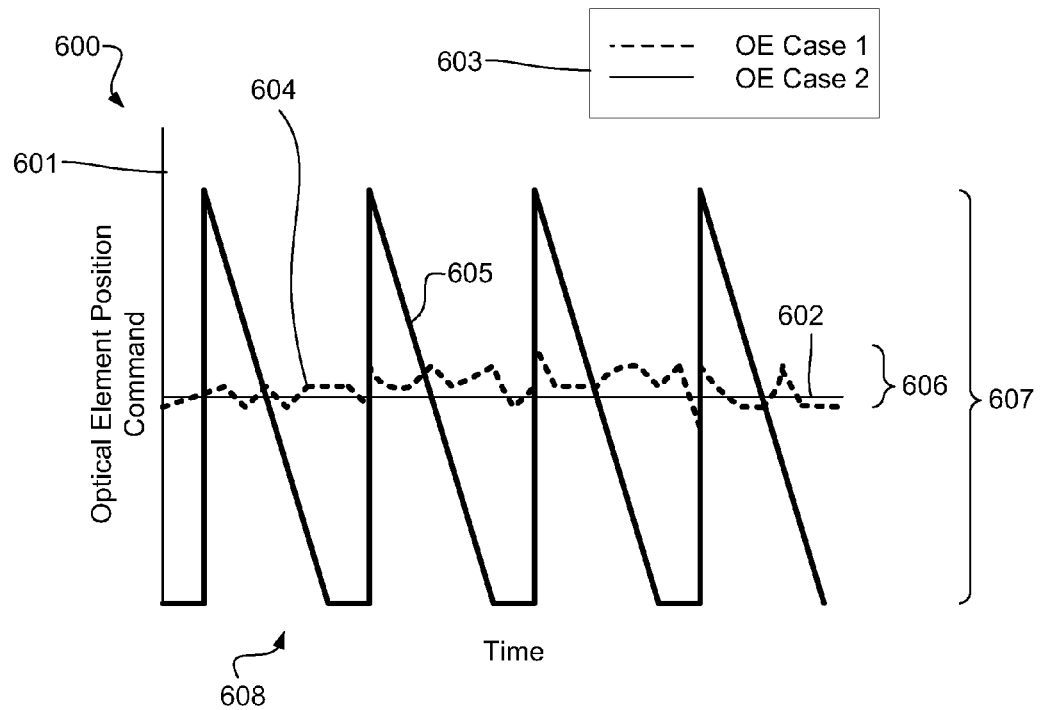
FIG. 6 is a diagram of an illustrative chart depicting illustrative information of a record, according to principles described herein.

FIG. 6 is a diagram of an illustrative chart (600) depicting illustrative information of a record. The x-axis (601) represents time, and the y-axis (602) represents the optical element position commands. A legend (603) indicates the dashed line (604) corresponds to a first case and the solid line (605) corresponds to a second case.

In the example of FIG. 6, raw data representing the real time position of the optical element may be depicted. Here, the optical element position command of the first case may appear relatively consistent because the amplitude (606) of the dashed line (604) is minimal. This may correspond to a photoconductor drum experiencing a relatively consistent rotary speed. Thus, the dashed line (604) may depict a photoconductor operating within a normal operating condition. However, even under normal operating conditions, the optical element controller may command the optical element may move in a substantially cyclic pattern, but the intensities of these movements may be minimal and not indicate an issue.

However, in the example of FIG. 6, the optical element position command of the second case may comprise greater variation because the amplitude (607) of the solid line (605) is greater. The larger amplitude may correspond to a case where the photoconductor drum is experiencing inconsistent rotary speeds. Further, the steeper the descent of solid line (605), the faster the optical element is likely commanded to compensate for the inconsistent speeds of the photoconductor drum. In the example of FIG. 6, the descent of the solid line's cycles (608) is more gradual than the ascent. At the bottom of each descent, the solid line (605) levels off indicating that the optical element is at its mechanical limit before the optical element is commanded to reset. In the example of FIG. 6, the ascent of the solid line's cycles (608) is steeper than the descent and may correspond to the reset. This may suggest that the rotary speed of the photoconductor drum is too difficult for the optical element controller to match. Such a pattern may give insight to which issues the printer is experiencing.

Figure 7:
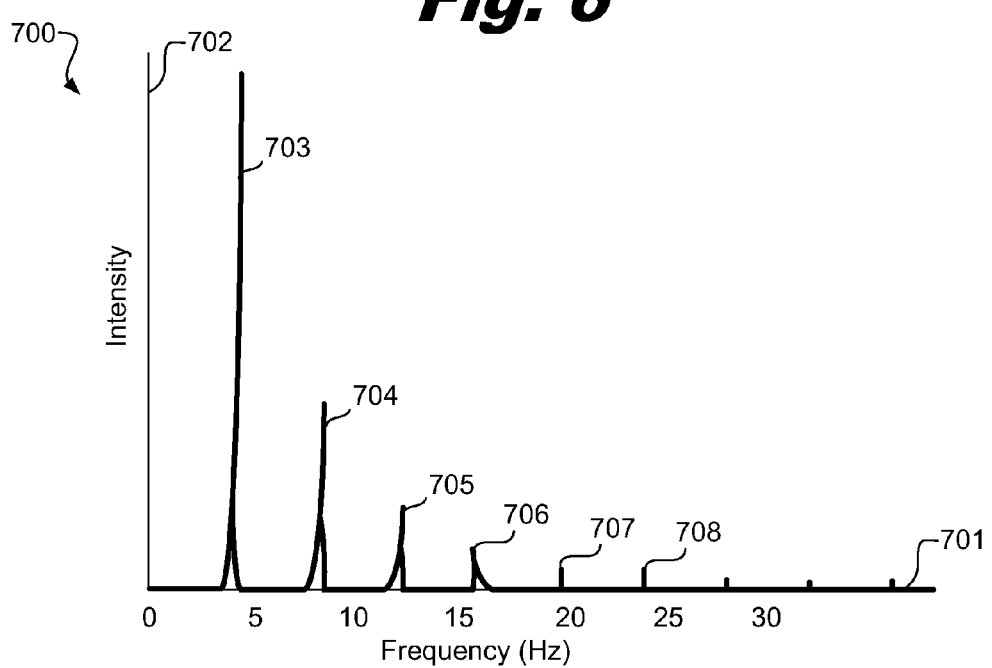
FIG. 7 is a diagram of an illustrative Fourier transform depicting illustrative information from a record, according to principles described herein.

FIG. 7 is a diagram of an illustrative chart (700) depicting illustrative information from a record. In the example of FIG. 7, the chart may be a Fourier transform of the second case depicted in FIG. 6. Other formats that may illustrate useful information to a user or repair person may include charts containing information derived through Fourier analysis, pattern recognition techniques, other techniques, and combinations thereof.

In the example of FIG. 7, the frequency of the optical element position command is depicted along the x-axis (701), and the intensity of those frequencies is depicted on the y-axis (702). In FIG. 7, the fundamental frequency (703) of the commanded optical element positions may be four hertz. That fundamental frequency (703) may correspond to particular issue, such as a particular gear's failure, loose bearing, etc. Other fundamental frequencies may correspond to other specific issues.

In the example of FIG. 7, higher harmonics (704), (705), (706), (707), and (708) occur at approximately eight hertz, twelve hertz, sixteen hertz, twenty hertz, and twenty four hertz. The higher harmonics may also contribute to an understanding of the printer's issues as well.

The format of the information in the illustrative record of FIGS. 6 and 7, other formats, and information derived from these various formats may assist in determining which issues are likely. For example, in FIG. 7, the height of each peak, the ratio of the peak's height, the space between frequency intensities, trends of increasing or decreasing peak amplitude with frequency, or combinations thereof may contribute to identifying the likely issues with the printer.

The record may contain information that reflects a rotational velocity profile of the photoconductive drum. The information may reveal unique patterns that are associated with specific issues. Also, in some examples, the principles described herein may also contribute to determining issues with the optical element controller, electrical issues, position adjusters, the gripper wheels, fuser units, and combinations thereof.

In some examples, the analysis of the information in the record reveals likely issues with the printer. However, in some examples, the analysis may provide a user or a repair person a starting point. The analysis of the record may be confirmed through troubleshooting the printer or replacing suspected parts. In some examples, the analysis is refined to such a degree that the issue is accurately detected without further investigation.

In some examples, the printer, upon recognition of an issue, may perform a test and may send a repair person the record or analysis. The repair person may know before examining the printer what the likely issues are. In some examples, the repair person may become aware of the printer's issues before the printer's users become aware. Thus, the repair person may notify the printer's users of the potential issues before users experience frustration with the printer. In some examples, the repair person may identify the issues remotely and have replacement parts shipped to the printer's location prior to the repair person arriving on site. In other examples, where the record or analysis may reveal electrical issues associated with the printer's components, the repair person may perform additional diagnostics, maintenance, and/or repairs remotely. Thus, the principles described herein may contribute to a high level of customer satisfaction and quick resolution to printer issues.

While the above description has made reference to a single photoconductor, the same principles may be applied to digital printers that utilize multiple photoconductor drums, such as some types of color printers. In such examples, a single recorder may be associated with each optical element or a single recorder may create a record of the commands to each optical element. In some examples, the printer may comprise additional complexity not described herein.

The principles described herein may also detect issues that occur along the printing pathway of the printer. For example, an upstream issue, such as a malfunctioning gripper wheel, may provide an inconsistent flow of printing media to the pressure drum, which may affect the rotation of the photoconductor drum. Further, processes downstream of the pressure drum may also experience issues that cause the printing media to back up at the pressure drum, which may also affect the photoconductor drum's rotation. In some examples, a downstream component whose malfunction may affect the rotational velocity of the photoconductor drum is the fuser unit.

The issue detection principles described herein may be cost effective because a single system may be used to detect multiple issues. Thus, additional hardware components and application costs may be kept to a minimum.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for detecting an issue in a digital printer, comprising:
    sending optical element position commands to move an optical element to compensate for inconsistent movements of a photoconductor surface, said optical element positioned to direct a laser beam towards said photoconductor surface;
    creating a record of said optical element position commands; and
    comprising analyzing said record to detect an issue;
    wherein analyzing said record to detect an issue is performed in real time.

2. The method of claim 1, wherein said analyzing identifies a component of said digital printer that is likely contributing to said inconsistency in said movement of said photoconductor surface.

3. The method of claim 1, wherein said record comprises at least one parameter selected from a group consisting of time, an angular position command of said optical element, machine angle, position command of said motor, actual position of said motor, speed command of said motor, actual speed of said motor, electrical current command to said motor, actual electrical current of said motor, and combinations thereof.

4. The method of claim 1, further comprising sending said record to a remote location.

5. The method of claim 1, further comprising displaying at least one parameter of said record.

6. The method of claim 1, wherein said photoconductor comprises a rotating drum and said record comprises a sampling frequency faster than a frequency of said photoconductor drum rotation.

7. The method of claim 1, wherein said photoconductor comprises a drum and sending optical element position commands to move an optical element to compensate for inconsistent movements of a photoconductor surface includes sending optical element position commands based on output from a position sensor that reads an angular position of said photoconductor drum.

8. A system for detecting an issue in a digital printer, comprising:
    an optical element positioned to direct a laser beam to form a latent image on a photoconductor surface, an optical element controller programmed to send optical element position commands to compensate for inconsistent movements of said photoconductor surface;

a recorder programmed to create a record of said optical element position commands; and an analyzer programmed to analyze said record to detect an issue, wherein analyzing said record to detect an issue is performed in real time.

9. The system of claim 8, wherein said analyzer is programmed to identify a component of said digital printer that is likely contributing to said inconsistency in said movement of said photoconductor surface.

10. The system of claim 8, further comprising a user interface that displays at least one parameter of said record.

11. The system of claim 8, further comprising a position sensor programmed to output an angular position of said photoconductor drum to said optical element controller.

12. A digital printer, comprising:

a marking engine comprising a photoconductor for receiving a latent image;

an optical element positioned to direct a laser beam towards a surface of said photoconductor, an optical element controller programmed to send optical element position commands to move said optical element, wherein said optical element controller adjusts for variations in a velocity of said photoconductor;

a recorder programmed to create a record of said optical element position commands; and an analyzer programmed to analyze said record to detect an issue, wherein analyzing said record to detect an issue is performed in real time.

13. The printer of claim 12, further comprising a user interface that displays said record.

14. The printer of claim 12, further comprising a user interface that displays at least one parameter of said record.

15. The printer of claim 12, wherein said photoconductor comprises a photoconductor drum that rotates with an angular velocity, said printer further comprising a position sensor programmed to output an angular position of said photoconductor drum to said optical element controller.

16. The printer of claim 12, wherein said analyzer is programmed to provide an indication of which part in said printer is likely contributing to variation in a rotational speed of said photoconductor.

* * * * *